UNITED STATES PATENT OFFICE.

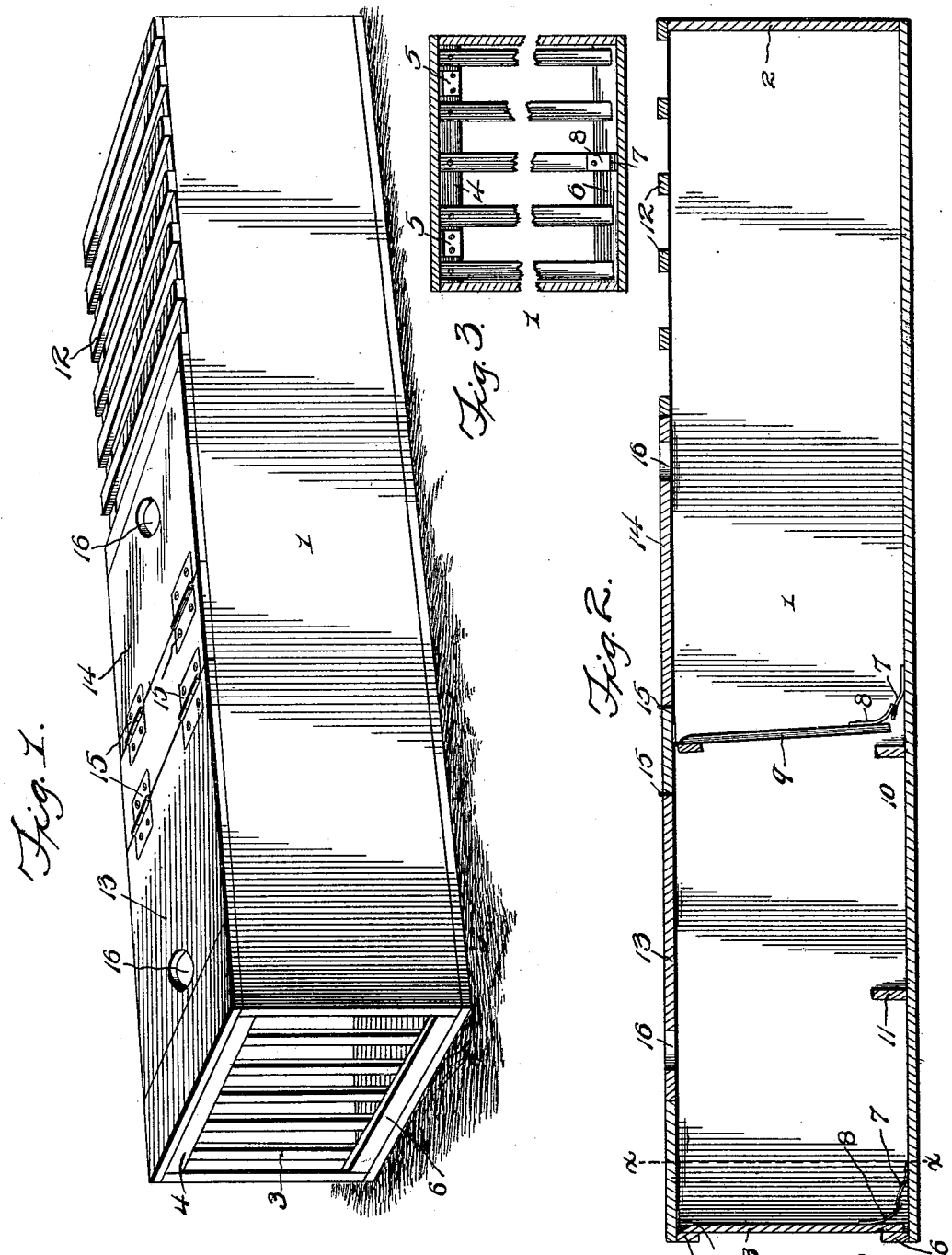

JULIUS P. HECK, OF PITTSFIELD, ILLINOIS.

NEST-BOX.

SPECIFICATION forming part of Letters Patent No. 635,932, dated October 31, 1899.

Application filed August 9, 1899. Serial No. 726,695. (No model.)

*To all whom it may concern:*

Be it known that I, JULIUS P. HECK, a citizen of the United States, residing at Pittsfield, in the county of Pike and State of Illinois, have invented a new and useful Nest-Box, of which the following is a specification.

This invention relates to poultry-culture, and has for its object to provide an improved nest-box for housing a hen's nest and having means for protecting the hen upon the nest from intrusion and interference by other fowls.

A further object of the invention is to provide the box with swinging gates, which are normally open to facilitate the entrance of the hen, but which will automatically close after the hen, so as to exclude other fowls and also to prevent the return of the hen to the nest-compartment after the egg has been deposited, whereby the hen is prevented from eating or damaging the egg.

In the successful and practical culture of poultry it becomes necessary to keep a record of the egg-producing capacity of the individual fowls, and in view of this necessity the present invention has been designed to facilitate the keeping of such a record by confining the hen after the egg has been laid, so that the latter may be marked and a proper record maintained.

To these ends the present invention consists in the combination and arrangements of parts, as will be hereinafter more fully described, shown in the accompanying drawings, and particularly pointed out in the appended claims, it being understood that changes in the form, proportion, size, and the minor details of construction may be made within the scope of the appended claims without departing from the spirit or sacrificing any of the advantages of the present invention.

In the drawings, Figure 1 is a perspective view of the improved nest-box. Fig. 2 is a longitudinal sectional view thereof. Fig. 3 is a transverse sectional view taken on the line *x x* of Fig. 2.

Corresponding parts in the several figures of the drawings are denoted by like characters of reference.

Referring to the accompanying drawings, 1 designates a substantially oblong box, having its rear end normally closed by a fixed wall 2.

The front end of the box is normally open and may be closed by a swinging gate 3. This gate is preferably slatted, as shown, and is provided at its upper end with a transverse bar 4, which connects the slats together and is swung from the under side of the top of the box by means of a pair of hinges 5, so that the gate may swing inward only. Across the bottom of the box and at the entrance thereof there is provided a transverse stop 6, against which the lower free end of the gate is adapted to engage, so as to prevent the gate from being pushed or swung outward.

Fixed to the bottom of the box and adjacent to the inner side of the gate there is provided a keeper 7, which is preferably formed from a single length of strap metal fastened at one end to the bottom of the box and having its forward free end bent or deflected upward clear of the bottom of the box. The middle slat of the gate is provided with a spring-catch 8, which is formed from a single piece of strap metal and comprises a shank which is fastened to the lower end of the slat and has its lower free end bent or deflected outwardly and upwardly into a catch-head adapted to engage beneath the upwardly-deflected free end of the keeper, so as to lock the gate against being opened inwardly. Intermediate of the length of the box there is provided a similar gate 9, having a catch and keeper, as described for the outer gate, and normally rests against a transverse stop-bar 10, provided upon the bottom of the box, so as to prevent outward swinging of this gate. Thus the interior of the box is divided into two compartments, of which the outer is the smaller. Between the two gates there is provided an intermediate transverse stop-bar 11, and between the latter and the inner stop-bar 10 it is designed to place the nest, which may be of any preferred construction. These two adjacent stop bars or shoulders prevent accidental displacement of the nest by the fowls.

The rear portion of the box and the rear compartment are provided with a slatted cover 12, so as to provide for light and ventilation and to conveniently observe when the fowl has left the nest and entered the rear or confinement compartment.

Hinged covers 13 and 14, respectively, are provided at opposite sides of the inner gate, having their hinges 15 located adjacent to the gate, and also provided with finger-holes 16 near their free ends, so as to facilitate the opening thereof. By this means access may be readily had to either compartment, so as to remove the hen and the egg and position or remove the nest.

In the operation of the device the outer or entrance gate is normally unlatched, with the catch resting upon the top of the keeper, as indicated by the inner gate, which is also normally unlatched. The hen may readily enter the nest-compartment by pushing against the gate, which will swing inward and upward, and after the hen has passed into the box said gate will swing downwardly and the catch thereof will automatically engage the keeper and lock the gate against the entrance of another fowl and also prevent the exit of the hen within the nest-compartment. After depositing the egg the hen will naturally seek to get out of the box and accordingly will pass through the inner gate into the confinement-compartment, the gate locking automatically after the hen and preventing the return thereof into the nest-compartment, thereby protecting the egg against damage by the hen and keeping her confined until released by the attendant.

From the foregoing description it will be evident that the present invention provides a simple and efficient nest-box which will protect the eggs against damage by the fowls, prevent the laying hen from being interfered with by the other fowls, also provides means for ascertaining the egg-producing capacity of the individual fowl, and has few parts to become broken or damaged.

Having thus described the invention, what I claim, and desire to secure by Letters Patent, is—

1. A nest-box, having an inwardly-swinging gate at the entrance thereof, an inner gate swinging in the same direction as the outer gate, and dividing the interior of the box into a rear or inner confinement-compartment, and an outer or front nest-compartment, stops for limiting the outward-swinging movement of the respective gates, automatic means for locking the gates against opening inward, and a door or cover for each compartment, substantially as shown and described.

2. A nest-box, having an inwardly-swinging gate at the entrance thereof, and swung from the top of the box, a transverse stop-shoulder provided upon the bottom of the box, and engaging against the outer side of the lower free edge of the gate, and automatic means for locking the gate against opening inward, an inner gate swinging in the same direction as the outer gate, and dividing the interior of the box into an inner confinement-compartment, and an outer nest-compartment, a transverse stop-shoulder arranged against the outer side of the lower free edge of the gate, automatic means for locking the gate against opening inward, and a door or cover for each of the compartments, substantially as shown and described.

3. A nest-box, having an inwardly-swinging gate at the entrance thereof, and a similar gate located intermediate of the ends of the box, and dividing the interior thereof into an inner confinement-compartment, and an outer nest-compartment, each gate being provided at its free edge with a spring-catch, keepers provided upon the box and engaging the respective catches, the latter normally resting upon the keepers and not confined thereby, and a door or cover for each compartment, substantially as shown and described.

4. In a device of the class described, the combination with a substantially oblong box, open at one end and closed at the opposite end thereof, of an inwardly-swinging gate located at the entrance of the box, and swung from the top thereof, a transverse stop-shoulder provided upon the bottom of the box and against the outer free edge of the gate, automatic means for locking the gate against inward opening, an inner gate swung from the top of the box and swinging in the same direction as the outer gate, a transverse stop-shoulder provided upon the bottom of the box and against the outer free edge of the inner gate, automatic means for locking the latter gate against inward opening, the inner gate dividing the interior of the box into an inner confinement-compartment, and an outer nest-compartment, a transverse shoulder provided within the nest-compartment, a slatted cover for the confinement-compartment, and a door or cover for each compartment, substantially as shown and described.

In testimony that I claim the foregoing as my own I have hereto affixed my signature in the presence of two witnesses.

JULIUS P. HECK.

Witnesses:
S. L. MORGAN,
O. WILLIAMSON.